US008584621B2

(12) United States Patent
Lee

(10) Patent No.: US 8,584,621 B2

(45) Date of Patent: Nov. 19, 2013

(54) LABORATORY ANIMAL RETAINING APPLIANCE

(75) Inventor: Jeong Ik Lee, Seoul (KR)

(73) Assignee: Konkuk University Industrial Cooperation Corp. (KR)

( * ) Notice: Subject to any disclaimer, the term of this patent is extended or adjusted under 35 U.S.C. 154(b) by 56 days.

(21) Appl. No.: 13/062,303

(22) PCT Filed: Sep. 4, 2008

(86) PCT No.: PCT/KR2008/005201
§ 371 (c)(1),
(2), (4) Date: May 4, 2011

(87) PCT Pub. No.: WO2010/027110
PCT Pub. Date: Mar. 11, 2010

(65) Prior Publication Data
US 2011/0308478 A1 Dec. 22, 2011

(51) Int. Cl.
*A01K 15/04* (2006.01)

(52) U.S. Cl.
USPC .......................................... 119/752; 119/751

(58) Field of Classification Search
USPC ................. 119/712, 751, 752, 809, 416, 417
See application file for complete search history.

(56) References Cited

U.S. PATENT DOCUMENTS

| | | | | | |
|---|---|---|---|---|---|
| 2,540,650 | A | * | 2/1951 | Brosene, Jr. et al. | 119/751 |
| 3,739,751 | A | * | 6/1973 | Mohr et al. | 119/752 |
| 3,973,522 | A | * | 8/1976 | Rosow | 119/756 |
| 5,320,069 | A | * | 6/1994 | Anderson et al. | 119/751 |
| 5,816,197 | A | * | 10/1998 | DeStefano et al. | 119/712 |
| 5,927,234 | A | * | 7/1999 | Siegel | 119/751 |

* cited by examiner

*Primary Examiner* — Monica Williams
*Assistant Examiner* — Timothy Schwarz
(74) *Attorney, Agent, or Firm* — The Belles Group, P.C.

(57) ABSTRACT

Disclosed is a laboratory animal retaining appliance for laboratory animal retention. The retaining appliance includes a plate-shaped body, and a hind leg hole which has a diameter for at least the knee of a hind leg of the laboratory animal to pass therethrough and which is formed at a position apart from a center line passing through the center of the body by a predetermined distance to at least one of the left and right of the center line.

11 Claims, 10 Drawing Sheets

LABORATORY ANIMAL RETAINING APPLIANCE

CROSS-REFERENCE TO RELATED PATENT APPLICATIONS

The present application is a U.S. national stage application under 35 U.S.C. §371 of PCT Application No. PCT/KR2008/005201, filed Sep. 4, 2008, the entirety of which is incorporated herein by reference.

BACKGROUND

1. Field

The present invention relates to a laboratory animal retaining appliance, which is used to give an injection, etc., to laboratory animals such as a rat and a mouse and the like.

2. Description of the Related Art

A retaining appliance proposed in the past allows an operation such as blood-gathering and injection and the like to be performed to a vein or an artery of a tail of a laboratory animal like a rat and a mouse, etc., by retaining the laboratory animal in a tube body of the retaining appliance, and by pulling the tail out through an end plate having a hole formed at the center thereof. (For example, see patent document 1 corresponding to Japanese Patent Document: publication number: 8-47502)

Here, when the laboratory animal is anesthetized by using the retaining appliance disclosed in the patent document 1, an intravenous injection can be used to anesthetize the laboratory animal. However, the injection to the vein of a tail often fails due to the thin vein. Therefore, an inhalation anesthesia is widely used by using gas such as diethylether and the like.

But, the gas is flammable and explosive, so that it is dangerous to an operator. Moreover, the gas smells unpleasant and does harm to the operator as well.

Further, the concentration of the gas is difficult to control, and the laboratory animal is occasionally dead due to the failure of the anesthesia before the experiment is finished. This is opposed to bioethics that the laboratory animal should feel pain as less as possible and the number of the laboratory animals used in the experiment should be minimized.

Besides, a method of injecting an anesthetic into an abdominal cavity is now used. However, the internal organs within the abdominal cavity of the laboratory animal may be injured by a needle. In addition, the anesthetic is distributed as if it coats the internal organs within the abdominal cavity, so that the anesthetic may affect the organs. Therefore, it is not suitable to use the method in an experiment using the organs within the abdominal cavity as an experimental material.

Anesthesia through intramuscular injection does not create the aforementioned problems. However, the retaining appliance disclosed in the patent document 1 is able to pull out only a tail from the end plate, so that the intramuscular injection cannot be performed. When the operator performs the intramuscular injection by himself/herself without the retaining appliance, the struggle of the laboratory animal makes the intramuscular injection very difficult, and the laboratory animal may bite the operator's hand.

The present invention is embodied in consideration of the aforementioned circumstances, and intends to provide a laboratory animal retaining appliance, which enables an operator to easily and safely perform operations such as intramuscular injection, etc., on the laboratory animal by himself/herself.

SUMMARY

One aspect of the present invention is a laboratory animal retaining appliance. The laboratory animal retaining appliance includes:

a plate-shaped body; and a hind leg hole which has a diameter for at least the knee of a hind leg of the laboratory animal to pass therethrough and which is formed at a position apart from a center line passing through the center of the body by a predetermined distance to at least one of the left and right of the center line.

The center corresponds to at least one of the center of the lengthwise direction of the body and the center of the widthwise direction of the body.

An operator passes the hind leg of the laboratory animal through the hind leg hole of the retaining appliance of the present invention, so that the operator's hand grasping the hind leg is protected from the laboratory animal by the body. Additionally, the hind leg of the laboratory animal is exposed such that the intramuscular injection can be performed to the hind leg.

A tail hole or a tail groove may be formed on the center line. The tail hole has having a diameter almost the same as that of the tail of the laboratory animal. The tail groove has a width almost the same as that of the tail of the laboratory animal and extends to the edge of the body.

A hind leg retaining part for retaining the hind leg may be formed in the hind leg hole.

The retaining appliance of the present invention may further include a side wall which has a shape almost the same as a tube, extends from the edge of the body in a direction perpendicular to the surface in which the hind leg hole, and has a sufficient length for the laboratory animal not to turn over its body.

The retaining appliance of the present invention may further include a tube body containing the laboratory animal therein and having a shape allowing the tube body to be attached to and separated from the body.

Another aspect of the present invention is a laboratory animal retaining appliance. The retaining appliance includes:

a body;

a tube body including outer circumferential surface extending the edge of the body, wherein a hind leg hole which has a diameter for at least the knee of a hind leg of the laboratory animal to pass therethrough is formed in the outer circumferential surface of the tube body.

The body may be integrally formed with the tube body.

The retaining appliance may further include a containing part which contains a second tube body containing the laboratory animal and is formed to be inserted into the tube body.

The containing part may further include a pusher which is pushed and inserted into the second tube body in such a manner as to move in the axial direction of the containing part.

DETAILED DESCRIPTION OF EMBODIMENTS

Figure 1:
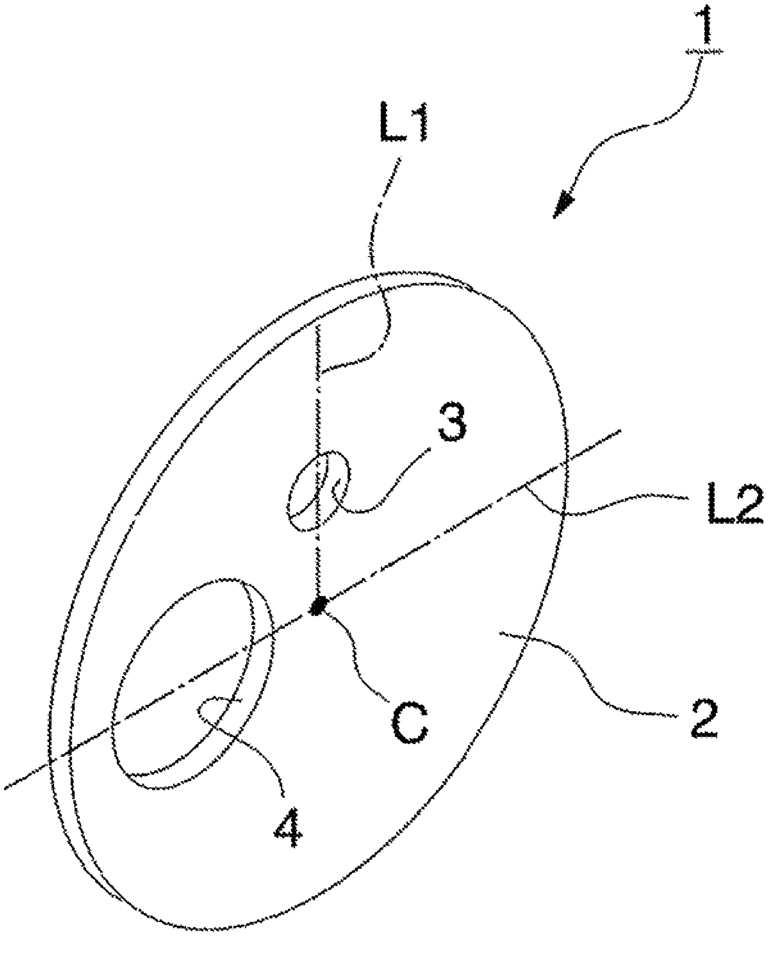
FIG. 1 is a perspective view showing a laboratory animal retaining appliance in accordance with a first embodiment of the present invention.

A laboratory animal retaining appliance (hereinafter, referred to as a retaining appliance) in accordance with a first embodiment of the present invention will be described with reference to FIGS. 1 and 2. As shown in FIG. 1, a retaining appliance 1 in accordance with the first embodiment has a circular shape having a diameter of about 10 cm and is formed of a resin material and a metal material. The retaining appliance 1 includes a plate-shaped body 2.

Though the body 2 may be formed of paper or wood, the body 2 is required to be formed of a resin material and a metal material because the body 2 can be reused by being sterilized after being used. The diameter of the body 2 is not limited to 10 cm. However, it is preferable that the diameter is equal to or larger than 8 cm in order to satisfactorily protect an operator hand and is equal to or less than 15 cm in order to easily handle the retaining appliance.

The numerical values are applied to a mouse, etc. However, with respect to an animal bigger than the mouse such as a rat and the like, the diameter of the body 2 is required to be set to about 30 cm.

The thickness of the body 2 is not limited to a particular value. However, through the consideration of the way of using the retaining appliance, which will be described below, the thickness of the body 2 is required to provide rigidity which allows the tail and hind leg of the laboratory animal to easily pass through the body 2 and which prevents the body 2 from easily being transformed at the time of retaining the tail or hind leg of the laboratory animal. In the retaining appliance 1 of the embodiment, the thickness of the body 2 is set to 1 mm.

A tail hole 3 having a diameter of from about 0.5 cm to about 1 cm is formed in the vicinity of the middle point of a first center line L1 passing through both the center C of the body 2 and one point of the circumference of the body 2. The diameter of the tail hole 3 is not limited to the aforementioned numerical values. When the diameter is set to a value which is almost the same as or slightly larger than the thickest portion of the tail of the laboratory animal, it is possible to satisfactorily restrain the tail of the laboratory animal.

When a rat is used as a laboratory animal, the diameter is required to be set to from 1 cm to 1.5 cm.

A hind leg hole 4 having a diameter of about 2 cm and allowing the hind leg of the laboratory animal to pass therethrough is formed at a position on a second center line L2 perpendicular to the first center line L1 at the center C. The position is apart on the left the center C by a predetermined distance, for example, 1 cm with respect to the tail hole 3.

For a rat and the like, it is required that the hind leg hole 4 having a diameter of about 3 cm is formed at a position away from the center C by a predetermined distance of 2 cm.

The hind leg hole 4 has a diameter allowing at least the knee of the hind leg of the laboratory animal to pass therethrough in order to give intramuscular injection to the hind leg. When the diameter of the hind leg hole 4 allows a junction between the body and the hind leg of the laboratory animal to pass therethrough, that is, allows the rump of the laboratory animal to be exposed from the hind leg hole 4, it is easier to give the intramuscular injection.

Since many laboratory animals have elliptical cross section of the hind legs, the hind leg hole 4 is required to be formed to have an elliptical shape. Here, the major axis of the ellipse is set to the numerical value.

An operation at the time of using the retaining appliance 1 formed as described above will be described with reference to FIGS. 2A to 2C. Here, the operation will be described with reference to an example of a case where the operation is performed on a mouse by using the retaining appliance 1.

Figure 2A:
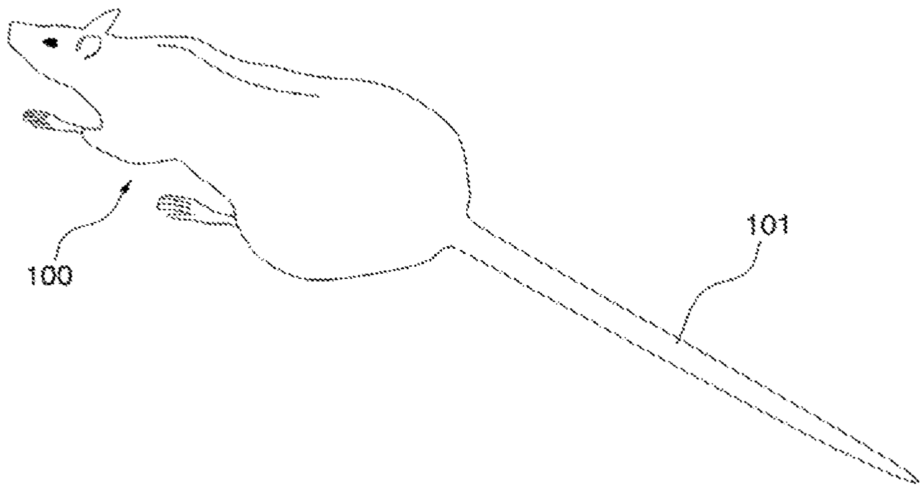
FIG. 2A is a perspective view describing the operation at the time of using the laboratory animal retaining appliance in accordance with the first embodiment of the present invention.

First, as shown in FIG. 2A. an operator grasps the tail 101 of a mouse 100 (a laboratory animal) and appropriately lifts up, and then keeps the mouse in so-called a hand cart state where the hind legs only are taken off the ground and the fore legs only contact with the ground. In this case, the mouse instinctively tries to move forward by its fore legs and has a difficulty in moving backward.

Figure 2B:
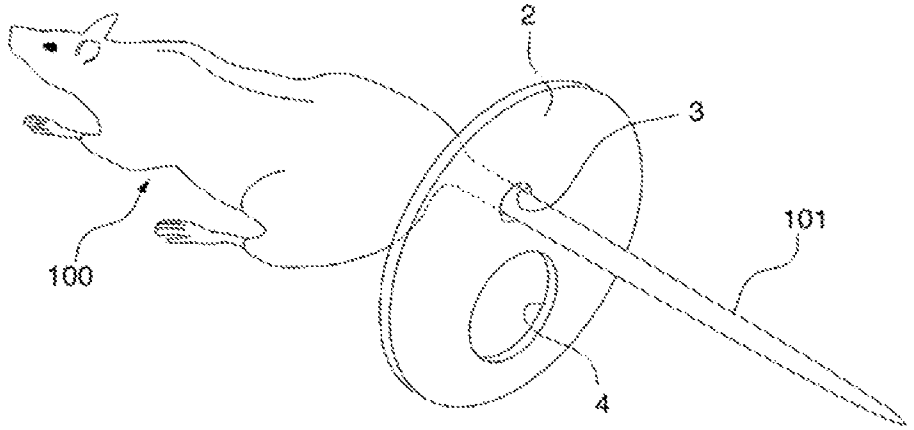
FIG. 2B is a perspective view describing the operation at the time of using the laboratory animal retaining appliance in accordance with the first embodiment of the present invention.

Under this state, the operator passes a rear portion of the tail 101 through the tail hole 3 of the body 2. As shown in FIG. 2B, the operator grasps and restrains the tail 101 of the mouse 100 which has passed through the tail hole 3. Under this state, an operation such as blood-gathering and injection and the like can be performed to a vein or an artery of a tail.

Figure 2C:
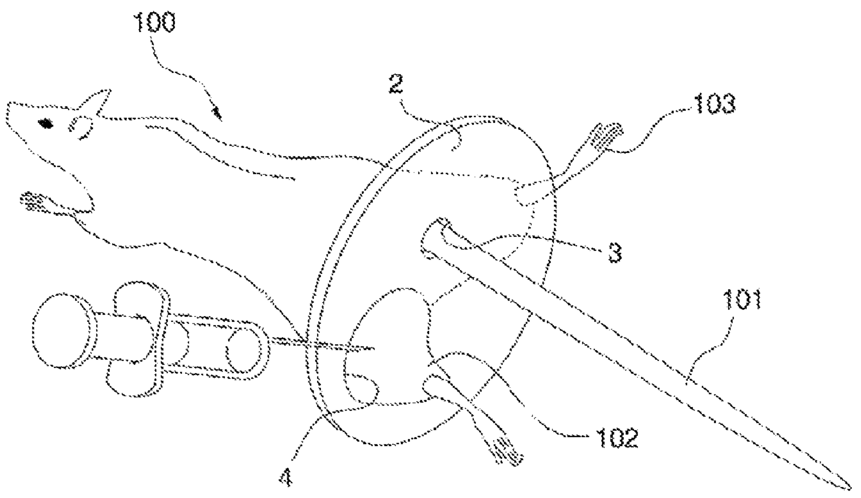
FIG. 2C is a perspective view describing the operation at the time of using the laboratory animal retaining appliance in accordance with the first embodiment of the present invention.

Regarding the intramuscular injection, under the state of FIG. 2B, as shown in FIG. 2C, the operator restrains a left hind leg 102 by passing the left hind leg 102 of the mouse 100 through the hind leg hole 4. Here, the tail 101 and the left hind leg 102 can be restrained to the body 2 only by restraining the left hind leg 102. Since the rump of the mouse 100 is exposed from the hind leg hole 4, the operator can perform the operation like the intramuscular injection to the muscle of the rump.

The method for passing the left hind leg 102 through the hind leg hole 4 is suitable for a right-handed operator. A left-handed operator can easily perform the operation by turning over the body 12 and by positioning the hind leg hole 4 on the right of the tail hole 3 as viewed from the operator and by passing a right hind leg 103 of the mouse 100 through the hind leg hole 4.

When the operator grasps the tail of the mouse, etc., by passing the tail through the tail hole 3 by using the retaining appliance 1 of the embodiment, the mouse instinctively tries to move forward. Therefore, the hand of the operator has less possibility of being bitten by the mouse. Meanwhile, when the mouse faces backward, the operator's hand is covered with the body 2, so that the hand of the operator is seldom bitten by the mouse. Accordingly, the operator is able to easily and safely restrain the laboratory animal by himself/herself.

Further, since the operator restrains the tail of the laboratory animal and passes the hind leg through the hind leg hole 4, the hind leg is exposed such that the intramuscular injection can be performed to the hind leg. Therefore, the operator can easily and safely perform the intramuscular injection to the laboratory animal. Further, the diameter of the hind leg hole 4 allows the hind leg and a junction between the body and the hind leg of the laboratory animal to pass through the hind leg hole 4. The diameter of the hind leg hole 4 is set to about 2 cm, thereby exposing the rump suitable for the intramuscular injection and restraining the laboratory animal.

Next, a retaining appliance in accordance with a second embodiment of the present invention will be described with reference to FIG. 3. A retaining appliance 11 of the second embodiment and the retaining appliance 1 of the first embodiment are different from each other in that the retaining appliance 11 includes a side wall, a tail groove instead of the tail hole and a hind leg hole of which the number and shape are different from those of the hind leg hole of the retaining appliance 1 of the first embodiment.

Figure 3:
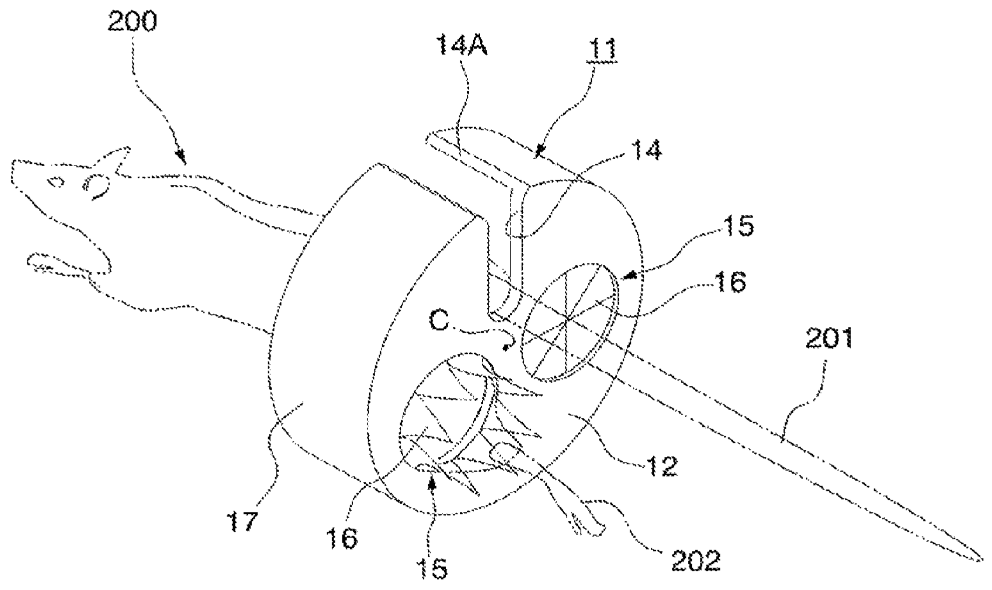
FIG. 3 is a perspective view showing a laboratory animal retaining appliance in accordance with a second embodiment of the present invention.

FIG. 3 is a perspective view showing the retaining appliance 11 in accordance with the second embodiment of the present invention. A body 12 of the retaining appliance of the second embodiment is formed of a resin material, etc. A tail groove 14 having a width almost the same as the diameter of the tail hole 3 is formed extending to the edge of the body 12 along a line passing through both center C and one point in the edge of the body 12.

A hind leg hole 15 is formed on the left and right of the center C, and in total, the two hind leg holes 15 are formed. Each of the hind leg holes 15 includes eight tongue-shaped pieces (hind leg restraining parts 16) which are made of an elastic material, for example, rubber. The tongue-shaped pieces have a shape of an isosceles triangle and are attached to the inside of the hind leg hole 15 in the manner of closing the hind leg hole 15.

A side wall 17 having a shape almost the same as a tube is formed extending from the edge of the body 12 in a thickness direction of the body 12, that is, in a direction perpendicular to the surface in which the hind leg hole 15 is formed. The side wall 17 has a sufficient length for the laboratory animal not to turn over its body in consideration of the body length of the corresponding laboratory animal. In the embodiment, the length of the side wall 17 is set to 10 cm. The side wall 17 also includes a tail hole 14A formed extending continuously from the tail hole 14 of the body 12 to the end of the side wall 17.

The operation at the time of using the retaining appliance 11 formed as described above will be described with reference to FIG. 3. Here, the operation will be described with reference to an example of a case where the operation is performed on a rat by using the retaining appliance 11.

First, an operator grasps the tail 201 of a rat (a laboratory animal) 200 and restrains the tail 201 by passing the tail 201 through the tail groove 14 from the side wall 17. Here, the rat 200 is restrained by the side wall 17 and has a difficulty in moving toward the operator by turning itself over.

While the tail 201 is restrained, the operator exposes a right or left hind leg 202 by passing either the hind leg 202 through the hind leg hole 15 by means of the same operation as that of the retaining appliance 1 of the first embodiment. Which hind leg hole 15 is used depends on the operator's hand mostly used.

As shown in FIG. 3, the rat's 200 hind leg 202 exposed from the hind leg hole 15 is restrained in the hind leg hole 15 by the resistance from the tongue-shaped pieces (hind leg restraining part 16) disposed in the hind leg hole 15. Thus, it is difficult for the rat to pull its leg out from the hind leg hole 15 when the operator releases the rat.

The retaining appliance 11 of the second embodiment enables the operator to restrain the tail by passing the tail of the laboratory animal through the tail groove formed in both the body 12 and the side wall. Therefore, it is possible to more easily restrain the laboratory animal.

Since the side wall 17 is formed extending from the edge of the body 12 and has a sufficient length for the laboratory animal not to turn over its body, the hand of the operator has less possibility of being bitten by the laboratory animal. Therefore, the retaining appliance becomes entirely compact by reducing the area of the body 12.

Moreover, since the hind leg holes 15 are formed on the right and left of the center C, it is unnecessary to turn over the body 12 regardless of the operator's hand mostly used. Thus, the retaining appliance is easier to handle.

Further, since the tongue-shaped pieces (hind leg restraining parts 16) disposed in the hind leg hole 15 restrain the exposed hind leg of the laboratory animal without being pulled out from the hind leg hole, it is possible to prepare, for example, an injection, with the laboratory animal restrained.

Next, a retaining appliance in accordance with a third embodiment of the present invention will be described with reference to FIGS. 4 and 5. A retaining appliance 21 of the third embodiment and the retaining appliance 1 of the first embodiment are different from each other in that the retaining appliance 21 includes a tube body and a hind leg hole having a different shape from that of the retaining appliance 1. The same reference numerals are used to denote the same elements as those of the retaining appliance 1, and descriptions of the same elements are omitted.

Figure 4:
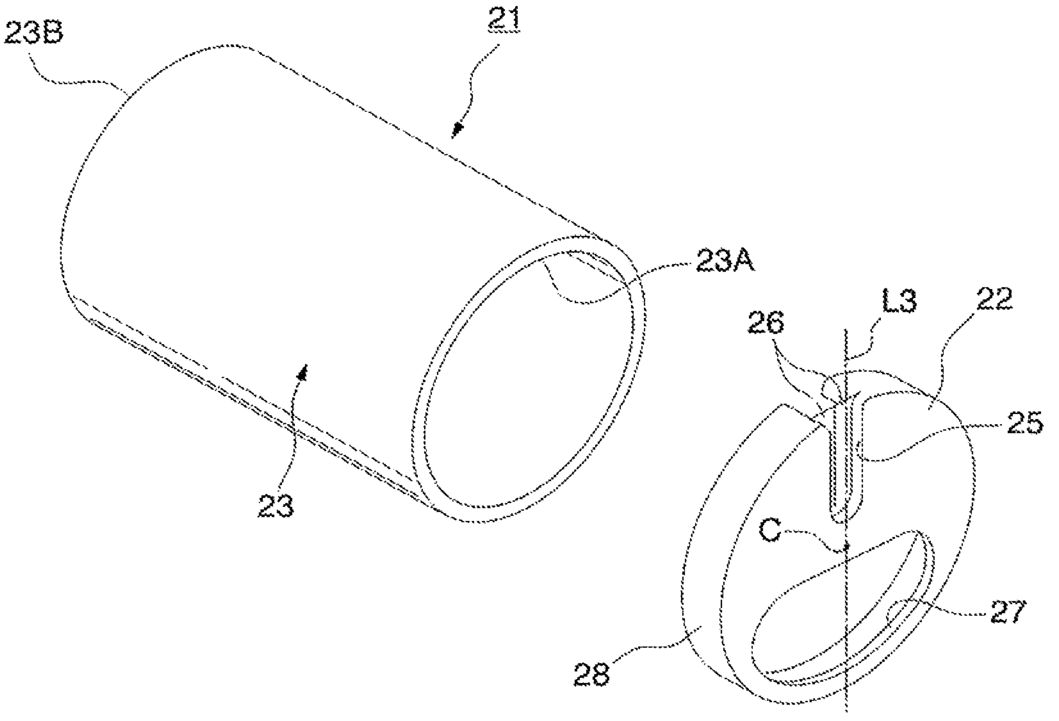
FIG. 4 is a perspective view showing a laboratory animal retaining appliance in accordance with a third embodiment of the present invention.

FIG. 4 is a perspective view showing a retaining appliance 21. The retaining appliance 21 includes a body 22 and a tube body 23 to which the body 22 is attached.

Like the body 2 of the retaining appliance 1 of the first embodiment, the body 22 is formed of a circular and plate-shaped member. The body 22 includes a tail groove 25 having a shape almost the same as that of the body 12 of the second embodiment. Two band-shaped packings 26 formed of an elastic material like rubber, etc., are attached to the tail groove 25 in the manner of filling the tail groove 25.

As shown in FIG. 4, a hind leg hole 27 of the third embodiment and the tail groove 25 are arranged facing each other with respect to the center C of the body 22. The hind leg hole 27 has a shape of an ellipse covering the left and right of a center line L3 passing through the tail groove 25 and the center C.

The edge of the body 22 projects 1 cm in a thickness direction through the whole circumference and includes an attachment 28 formed therein. The body 22 is attachable to and separable from the tube body 23 by covering the tube body 23 with the attachment 28.

The tube body 23 is formed in the shape of a cylinder by using paper, resin and metal and the like. An end 23A to which the body 22 is attached is opened. An end 23B opposite to the end 23A may or may not be opened. Here, the end 23B is required to be opened because a laboratory animal contained in the tube body 23 becomes calm when the end 23B is opened. The diameter and length of the tube body 23 are set to values almost the same as those of the body 22. However, as described below, the tube body 23 is required to have an appropriate size for the laboratory animal not to move excessively without a gap The tube body 23 may be fixed on a support and the like if necessary, in order to stably place the tube body 23.

An operation at the time of using the retaining appliance 21 formed as described above will be described with reference to FIG. 5 taking a rat as an example.

First, like the second embodiment, an operator grasps the tail 201 of a rat (a laboratory animal) 200 and restrains the tail 201 by passing the tail 201 through the tail groove 25. Here, the tail 201 is caught between the two packings 26 and cannot be easily pulled out from a tail hole 24.

Figure 5:
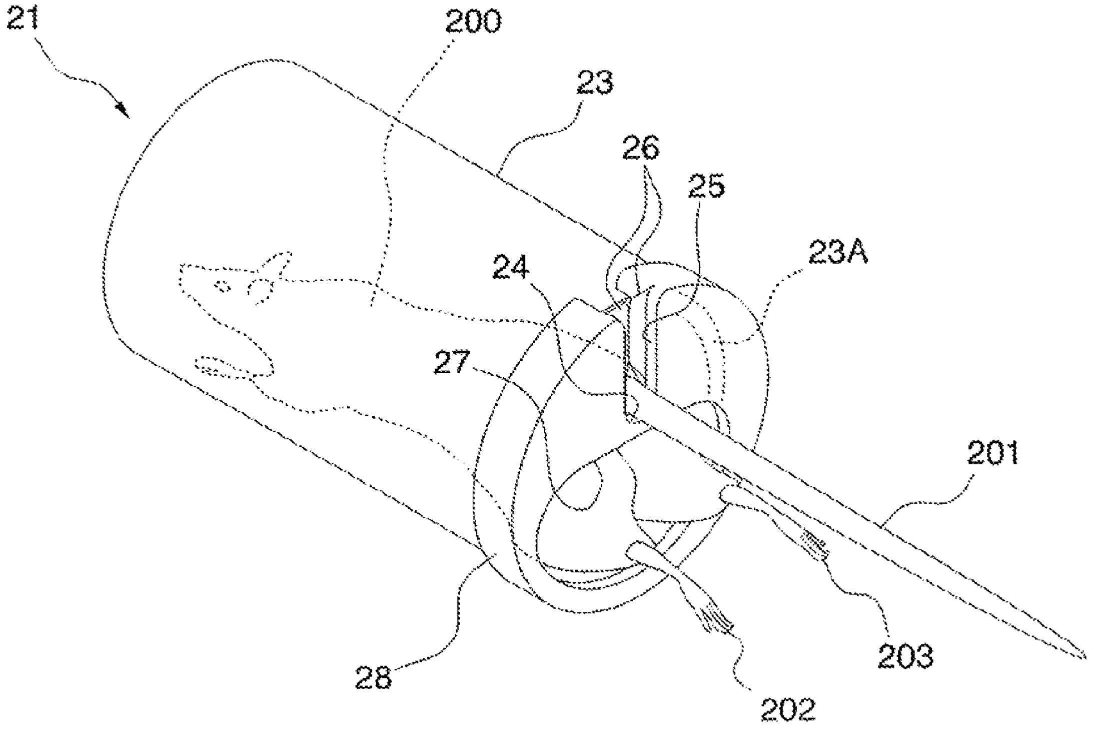
FIG. 5 is a perspective view describing the operation at the time of using the laboratory animal retaining appliance in accordance with the third embodiment of the present invention.

Subsequently, the operator passes the lower body of the rat 200 through the hind leg hole 27, so that the rump and left and right hind legs 202 and 203 of the rat are exposed as shown in FIG. 5. Under this state, the rat 200 is contained in the tube body 23. Then, the end 23A of the tube body 23 is covered with the attachment 28 of the body 22, so that the body 22 is integrally fixed to the tube body 23. Here, since the body of the rat 200 contacts with the inner wall of the tube body 23, the rat 200 instinctively becomes stable and calm.

The operator performs predetermined operations like an intravascular injection or an intramuscular injection to the tail, hind legs or rump of the exposed and fixed rat 200.

The retaining appliance 21 of the third embodiment contains and restrains the laboratory animal within the tube body 23, thereby considerably reducing the possibility that the hand of the operator is bitten by the laboratory animal. Moreover, since the tail and hind legs can be exposed in a relatively long time, it is possible to prepare an injection and the like through the spending of sufficient time.

Further, the large hind leg hole 27 is formed, so that the lower body including the left and right hind legs of the laboratory animal can be exposed from the hind leg hole 27. Therefore, operations on many or wide parts of the laboratory animal can be performed at a time.

Moreover, the packing 26 attached to the tail groove 25 causes the tail of the restrained laboratory animal not to be easily pulled out, performing the operations more easily.

Next, a retaining appliance in accordance with a fourth embodiment of the present invention will be described with reference to FIG. 6. A retaining appliance 31 of the fourth embodiment is different from the retaining appliances of other embodiments in that the retaining appliance 31 includes a hind leg hole that is formed in a tube body. The same reference numerals are used to denote the same elements as those of the retaining appliances of other embodiments, and descriptions of the same elements are omitted.

Figure 6:
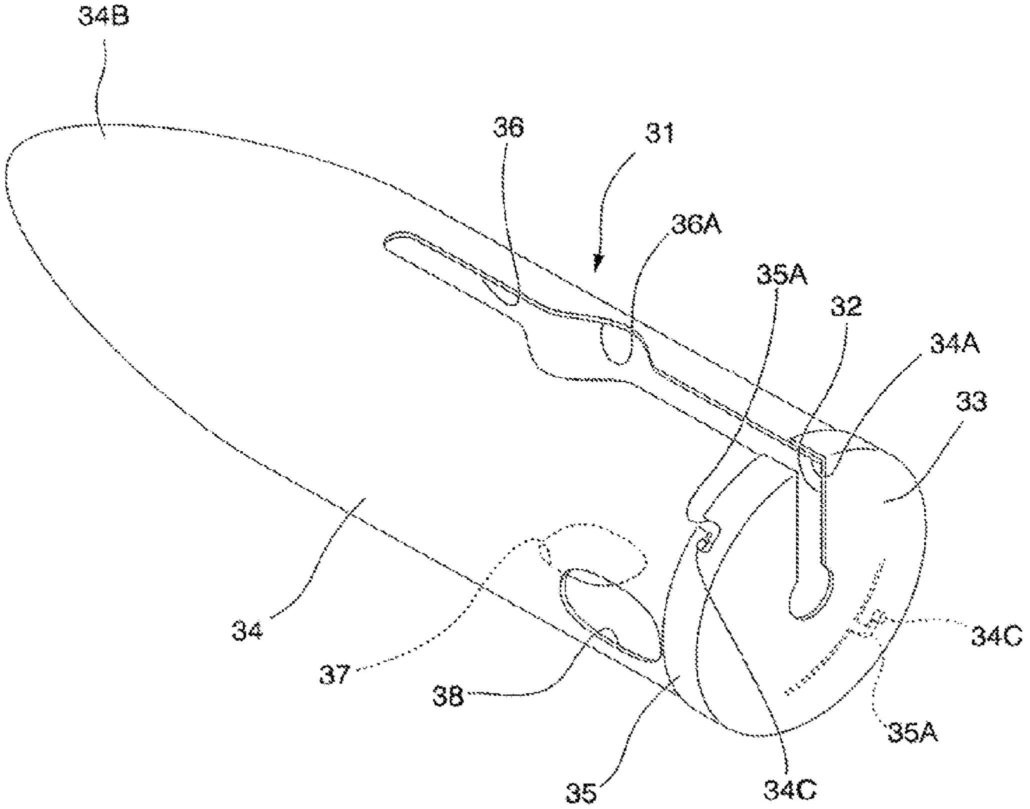
FIG. 6 is a perspective view showing a laboratory animal retaining appliance in accordance with a fourth embodiment of the present invention.

FIG. 6 is a perspective view showing the retaining appliance 31. The retaining appliance 31 includes a cover body 33 having a tail groove 32, and a tube body 34 to which the cover body 33 is attached.

The cover body 33 has a shape almost the same as that of the body 22 of the third embodiment. But the tail groove 32 of the cover body 33 has no packing, and the cover body 33 has no hind leg hole. An attachment 35 of the cover body 33 has a shape almost the same as the shape of the attachment 28 of the body22 and extends in a thickness direction. The attachment 35 includes two engagement grooves 35A for determining a position relative to the cover body 33. The two engagement grooves 35A are arranged facing each other with respect to the axis of the tube body 34.

The tube body 34 has a sufficient length for a mouse, a rat and a guinea pig and the like to be contained in the tube body 34. In the tube body 34, a first end 34A to which the cover body 33 is attached is opened. A second end 34B opposite to the first end 34A is closed in a spindle shape. Therefore, the overall shape of the tube body 34 is like a cannon ball.

A resin or metal and the like are used as a material of the tube body 34. When a metal material is used to form the tube body 34, it is possible to sterilize the tube body 34 at a high temperature, so that the tube body 34 can be continuously used. When the tube body 34 is formed to be transparent by using the resin material, it is advantageous to easily observe the state of the laboratory animal inside the tube body 34. Here, the tube body 34 made of the resin material is required to have chemical resistance in consideration of sterilization by alcohol for the purpose of continuous use. The material is determined appropriately depending on the use pattern, etc., of the retaining appliance 31.

A tail groove 36 having a width almost the same as that of the tail groove 32 is formed extending in the axial direction on the outer circumferential surface of the cylindrical portion of the tube body 34. The tail groove 36 includes a partially increased width and a hypodemic injection port 36A formed therein. An intraperitoneal injection port 37 is formed in the outer circumferential surface opposite to the tail groove 36.

Two engagement protrusions 34C which is engageable with the engagement groove 35A of the cover body 33 are formed on the outer circumferential surface around the first end 34A of the tube body 34. The engagement protrusion 34C is engaged with the engagement groove 35A through the attachment process to be described below. The engagement protrusion 34C is formed in a position in such a manner that the tail groove 32 of the cover body 33 is aligned with and connected to the tail groove 36 of the tube body 34 when the cover body 33 is integrally fixed to the tube body 34.

In the outer circumferential surface of the tube body 34, a hind leg hole 38 is formed between the tail groove 36 and the intraperitoneal injection port 37. The hind leg hole 38 may have a shape the same as that of each embodiment described above. The hind leg hole 38 may be formed on the left or right of the intraperitoneal injection port 37, or may be formed on both sides of the intraperitoneal injection port 37.

An operation at the time of using the retaining appliance 31 formed as described above will be described.

First, an operator grasps the tail of a laboratory animal like a mouse and a rat and the like. Then, the laboratory animal instinctively tries to move forward. Here, the operator places the laboratory animal toward the open first end 34A of the tube body 34. The laboratory animal enters the tube body 34 due to its behavior to enter a narrow place. Therefore, because the body of the laboratory animal contacts with the inner wall of the tube body 34, the laboratory animal instinctively becomes stable and calm in the tube body 34. Here, the second end 34B of the tube body has a shape that is almost similar to a spindle, so that it is suitable for the head shape of a mouse. Therefore, it is easier for the laboratory animal to feel stable. The operator pulls out the caught tail through the tail groove 36 and pulls out the hind leg through the hind leg hole 38.

Next, the operator grasps the tail and engages the two engagement grooves 35A of the cover body 33 with the two engagement protrusions 34C of the tube body 34, and then rotates the cover body 33 about the axis of the tube body 34.

Accordingly, as shown in FIG. 6, the cover body 33 and the tube body 34 are positioned such that the tail groove 32 of the cover body 33 is aligned with and connected to the tail groove 36 of the tube body 34. Consequently, the cover body 33 is integrally fixed to the tube body 34. The operator passes the tail through the tail groove 36, so that the laboratory animal is stably restrained in the retaining appliance 31.

In this case, the operator is able to easily perform an intramuscular injection to the hind leg of the laboratory animal pulled out from the hind leg hole 38. If necessary, the operator is able to give a hypodermic Injection or an intraperitoneal injection by using hypodemic injection port 36A and the intraperitoneal injection port 37. Moreover, as described in the embodiment, an injection can be given to the vein or artery of the tail pulled out from the tail groove 32.

According to the retaining appliance 31 of the fourth embodiment, since the hind leg hole 38 is formed in the outer circumferential surface of the tube body 34, the operation can be performed to the hind leg pulled out from the hind leg hole 38 when the laboratory animal becomes calm. Therefore, the operator is able to easily perform an intramuscular injection.

As described above, the engagement groove 35A is formed in the cover body 33. The engagement protrusion 34C is formed on the tube body 34. The engagement groove 35A is engaged with the engagement protrusion 34C, so that the cover body 33 and the tube body 34 are easily positioned and attached to each other, and are integrally fixed to each other such that the tail groove 32 is aligned with and connected to the tail groove 36.

Though the two engagement protrusions 34C and two engagement grooves 35A are formed in the embodiment, one or at least three engagement protrusions and one or at least three engagement grooves may be formed if the tail groove and the like are arranged not to be an interference with the dispositions of the engagement protrusion 34C and the engagement groove 35A. However, two or more engagement protrusions and engagement grooves are required to be formed in order to more surely fix the cover body 33 and determine the position of the tail groove.

In the fourth embodiment, the two engagement protrusions 34C and two engagement grooves 35A have the same shapes as each other. Instead of this, the engagement protrusions may have different shapes from each other and the engagement grooves may have different shapes from each other in such a manner that one engagement protrusion is engaged with only one engagement groove. In this case, the cover body 33 is attached to the tube body 34 in a particular direction, so that it is possible to more surely determine the position of the tail groove.

In the retaining appliance 31 of the fourth embodiment, the shape of the second end 34B, the hypodemic injection port 36A and the intraperitoneal injection port 37 are not necessarily required. They can be varied according to a requirement.

Next, a retaining appliance in accordance with a fifth embodiment of the present invention will be described with reference to FIGS. 7 to 8C. A retaining appliance 41 of the fifth embodiment and the retaining appliances of other embodiments in that the retaining appliance 41 includes a containing part for temporarily containing a laboratory animal in order to move the laboratory animal into a tube body. The same reference numerals are used to denote the same elements as those of the retaining appliances of other embodiments, and descriptions of the same elements are omitted.

Figure 7:
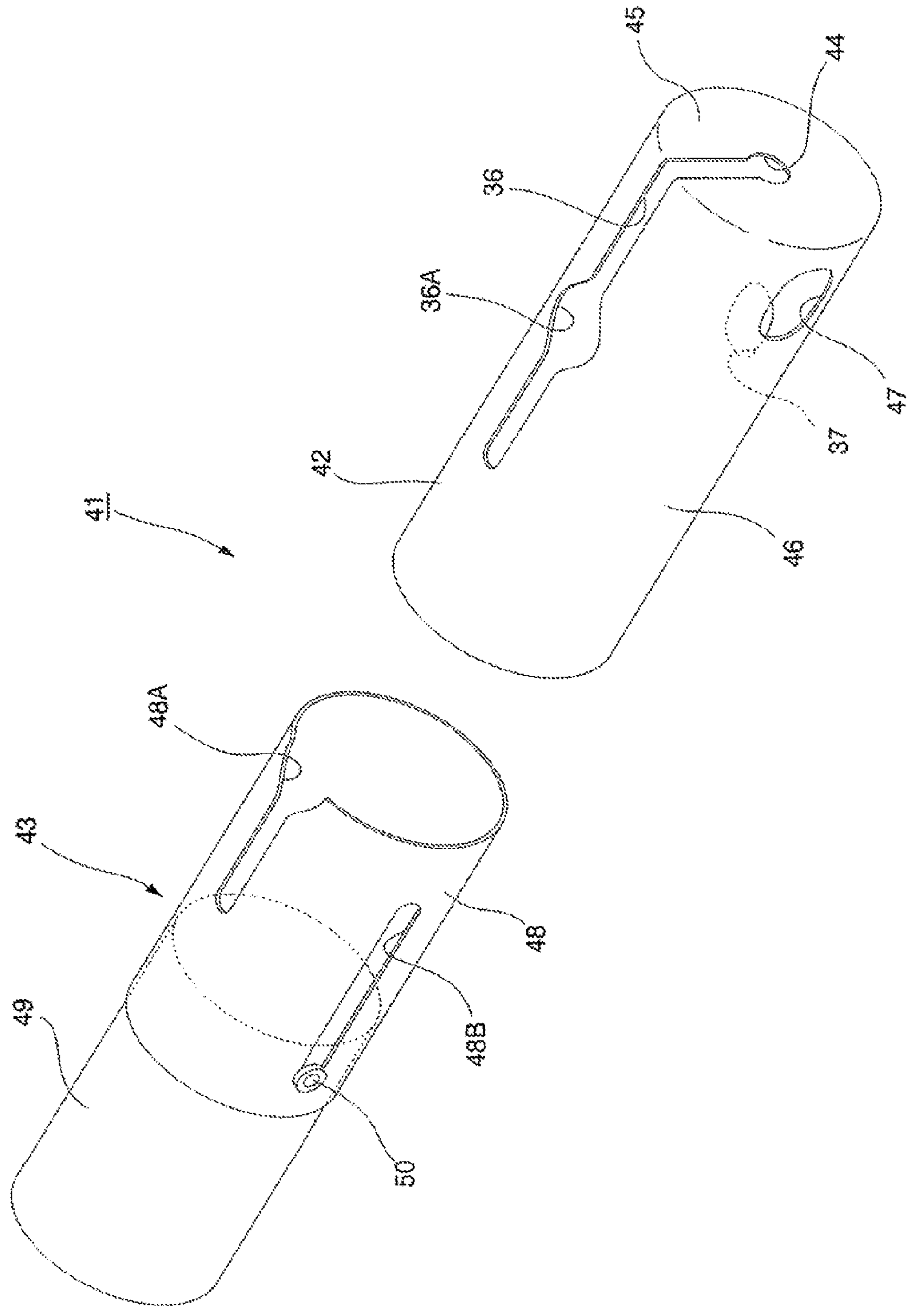
FIG. 7 is a perspective view showing a laboratory animal retaining appliance in accordance with a fifth embodiment of the present invention.

FIG. 7 is a perspective view showing the retaining appliance 41. The retaining appliance 41 includes a body 42 and a containing part 43 for temporarily containing a laboratory animal in order to move the laboratory animal to the body 42.

The body 42 has an almost cylindrical shape and includes a section 45 in which a tail hole 44 is formed and a side wall (a tube body) 46 extending from the edge of the section 45. The longitudinal length of the body 42 is the same as that of the tube body 34 of the fourth embodiment. The body 42 can contain a rat, a guinea pig and a laboratory animal having a size less than those of the rat and guinea pig. The end of the body 42, which is opposite to the section 45, is opened and the containing part 43 to be described below can be inserted into the end of the body 42.

Like the hind leg hole 38 of the fourth embodiment, a hind leg hole 47 is formed close to the section 45 of the side wall 46. That is, the hind leg hole 47 is formed in the side wall 46 forming the outer circumferential surface of the almost tube-shaped body 42. Further, like the tube body 34, the side wall 46 includes a hypodemic injection port 36A, intraperitoneal injection port 37 and a tail groove 36 aligned with and connected to the tail hole 44.

The containing part 43 includes a pushable pusher 49 and an outer tube (a second tube body) 48 which can be inserted into the body 42. The pushable pusher 49 is pushed and inserted into the outer tube 48 in such a manner as to move in the axial direction of the containing part 43.

The outer tube 48 includes an inner wall capable of containing a rat, a guinea pig and a laboratory animal having a size less than those of the rat and guinea pig. The outer diameter of the outer tube 48 is less than the inner diameter of the body 42. A notch 48A for pulling out a tail is formed in the outer circumferential surface of the outer tube 48. While one notch is formed in the fifth embodiment, two notches may be formed to face each other with respect to the axis of the outer tube 48 or three or more notches may be formed. In addition, the outer circumferential surface of the outer tube 48 includes a sliding groove 48B having a predetermined length, which is formed almost parallel with the axis of the outer tube 48.

The pushable pusher 49 which can be pushed has an almost cylindrical shape and an outer diameter less than the inner diameter of the outer tube 48. An unshown axis part of a fixing member 50 consisting of a pin, a bolt and the like is inserted into the sliding groove 48B from the outside of the outer tube 48, and is fixed to the pushable pusher 49 which can be pushed. As a result, the pushable pusher 49 which can be pushed is inserted, pushed and integrally fixed to the outer tube 48 in such a manner that the pushable pusher 49 is movable within the length of the sliding groove 48B in the axial direction of the outer tube 48

An operation at the time of using the retaining appliance 41 formed as described above will be described with reference to FIGS. 8A to 8C taking a mouse as an example.

Figure 8A:
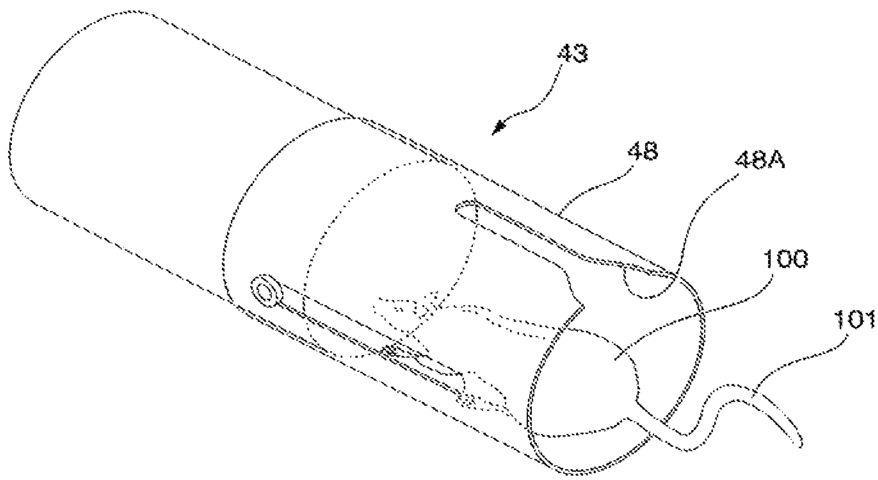
FIG. 8A is a perspective view describing the operation at the time of using the laboratory animal retaining appliance in accordance with the fifth embodiment of the present invention.

First, an operator grasps the tail 101 of a mouse 100 of a laboratory animal. As shown in FIG. 8A, the mouse 100 is contained in the outer tube 48 of the containing part 43. As described above, when the tail of a laboratory animal such as the mouse 100 and the like is grasped, the mouse 100 instinctively tries to move forward. Therefore, it is possible to contain the mouse 100 in the containing part 43 by easily moving the mouse 100 into the outer tube 48. The operator exposes the grasped tail 101 to the outside from the notch 48A. Here, the operator is required to place the notch 48A upward and contain the mouse 100 in the outer tube 48 so as to easily expose the tail 101 from the tail groove 36 of the body 42.

Figure 8B:
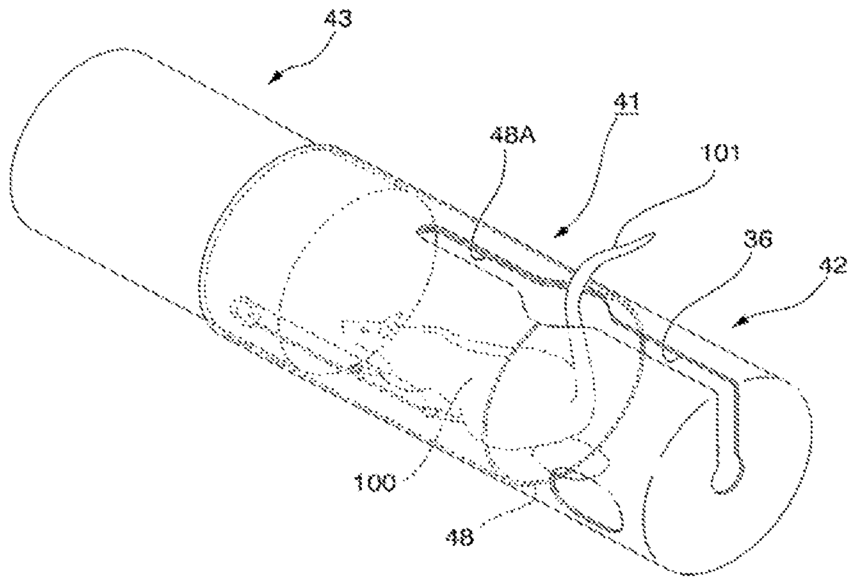
FIG. 8B is a perspective view describing the operation at the time of using the laboratory animal retaining appliance in accordance with the fifth embodiment of the present invention.

Next, under the state where the mouse 100 is contained inside the outer tube 48, the operator, as shown in FIG. 8B, inserts the containing part 43 into the body 42. The tail 101 of the mouse 100, which has been exposed from the notch 48A, is pulled out from the tail groove 36 to the outside of the body 42

Figure 8C:
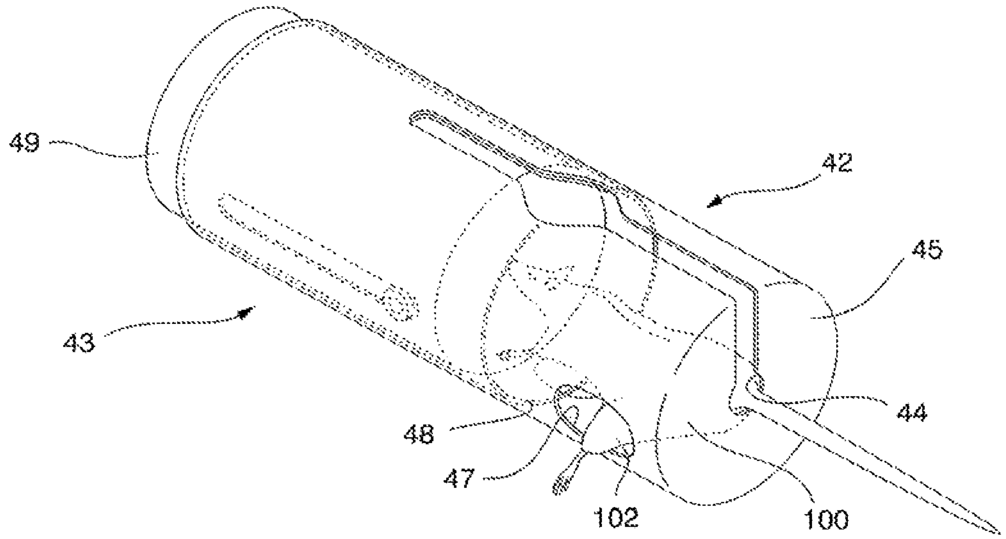
FIG. 8C is a perspective view describing the operation at the time of using the laboratory animal retaining appliance in accordance with the fifth embodiment of the present invention.

As shown in FIG. 8C, when the operator pushes the pushable pusher 49 toward the outer tube 48, the pushable pusher 49 comes into the inside of the outer tube 48 in the manner of filling the inner empty space of the outer tube 48. At the same time, the mouse 100 slowly steps back and comes out from the outer tube 48, and then moves toward the section 45 of the body 42. When the tail 101 of the mouse 100 comes out from the tail hole 44, the operator pulls out the hind leg 102 of the mouse 100 through the hind leg hole 47. As a result, the operator is able to perform operations. Then, the containing part 43 may be removed from the body 42. Otherwise, in order to prevent the mouse from moving forward and to stabilize, the containing part 43 may be held in the body 42 until the operation is completed.

Under the state where the mouse is restrained, the operator is able to perform various operations like an intramuscular injection, a hypodermic Injection, an arterial injection, an intravenous injection and an intraperitoneal injection and the like to the mouse 100.

The retaining appliance 41 of the Fifth embodiment includes the containing part 43 including the pushable pusher 49. Therefore, when a laboratory animal is contained in the containing part 43, the operator is able to perform operations by easily moving the laboratory animal to the inside of the body 42.

Besides, the operator causes the laboratory animal to step back to the section 45 of the body 42 by pushing the pushable pusher 49 into the outer tube 48. Therefore, regarding even a laboratory animal like a mouse smaller than the body 42, it is possible to expose the hind leg or tail by appropriately moving the laboratory animal to a position close to the section 45.

The operator is able to stop the laboratory animal from moving in the body 42 and to stably perform operations by setting the size of the inner space of the body 42 to an appropriate size for the laboratory animal by determining how much the pushable pusher 49 is pushed. Accordingly, the retaining appliance enables the operator to easily perform operations irrespective of the size of the laboratory animal.

With regard to the containing part 43, though the pushable pusher 49 is integrally fixed to the outer tube 48 in the fifth embodiment, the pushable pusher 49 may be separately provided, which is pushed and inserted into the outer tube 48 without being integrally fixed to the outer tube 48. Here, it is recommended that the pushable pusher 49 is integrally fixed to the outer tube 48, because the pushable pusher 49 is not separated from the outer tube 48 and is not removed during the performing the operations.

Further, the head of the laboratory animal may contact with the end surface of the pushable pusher 49. Therefore, the end surface facing the head of the laboratory animal may be formed to protrude to the outside of the pusher 49 such that the end surface is suitable for the head shape of a mouse, etc. That is, the end surface may have a spindle shape almost similar to that of the second end 34B of the tube body 34 of the retaining appliance 31 of the fourth embodiment.

In addition, the fifth embodiment has taken an example of a case where the fixing member 50 fixed to the pusher 49 moves in the sliding groove 48B formed in the outer tube 48. Instead of this, the containing part may be configured in such a manner that the fixing member fixed to the outer tube moves in the sliding groove formed in the pushable pusher.

In the foregoing, the present invention has been described. The technical scope of the present invention is not limited to the aforementioned embodiments and is variously modified without departing from the intention of the present invention.

Figure 9:
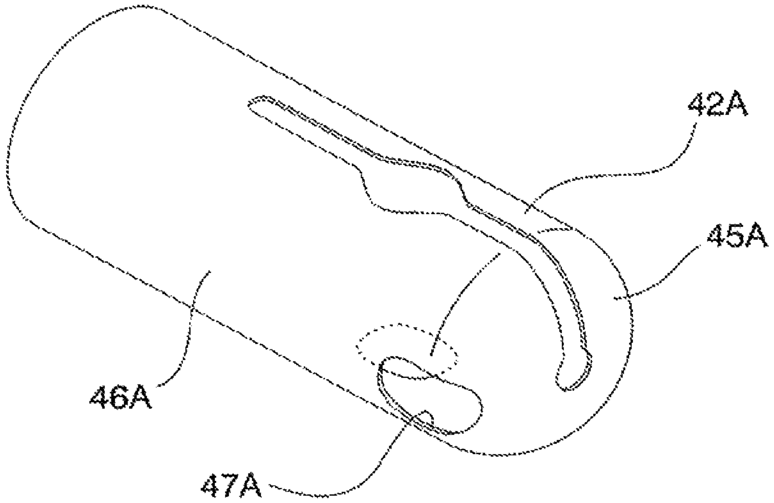
FIG. 9 is a partial perspective view showing a laboratory animal retaining appliance in accordance with a modified embodiment of the present invention.

For example, while the body is formed to include a plane in the aforementioned embodiment. Instead of this, FIG. 9 shows a modified embodiment that provides a body 42A having its overall curved surface shape in such a manner that a section 45A and a side wall 46A are continuously connected to each other without a boundary therebetween. In this case, a hind leg hole 47A is easy to form at a position covering both the section 45A and the side wall 46A. Therefore, it is possible to optimize the position at which the hind leg hole 47A is formed.

Figure 10:
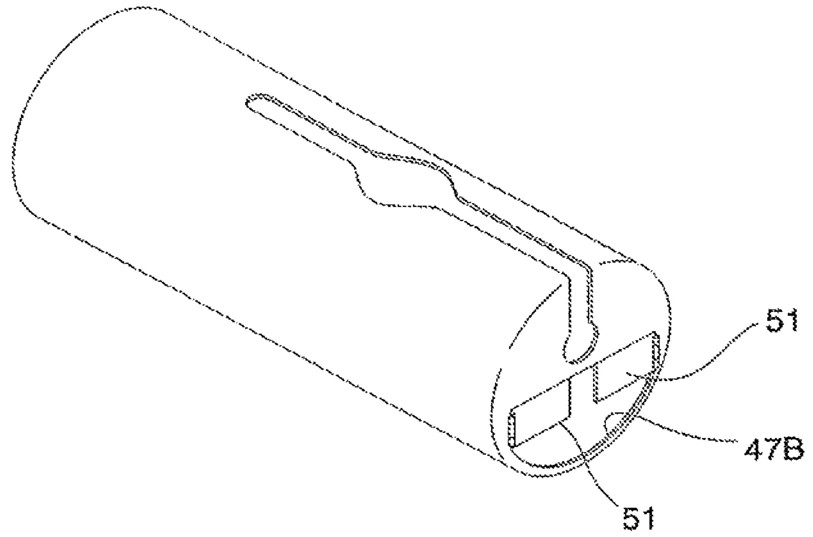
FIG. 10 is a partial perspective view showing a laboratory animal retaining appliance in accordance with another modified embodiment of the present invention.

Additionally, FIG. 10 shows another modified embodiment. As shown in FIG. 10, a relatively large hind leg hole 47B is formed, and then a door 51 which is intended to be always closed by an force-applying member (not shown) may be attached around a portion of the hind leg hole 47B. In this way, it is possible both to satisfactorily restrain the exposed hind leg and to control the size of the hind leg hole depending on the size of the laboratory animal.

Figure 11:
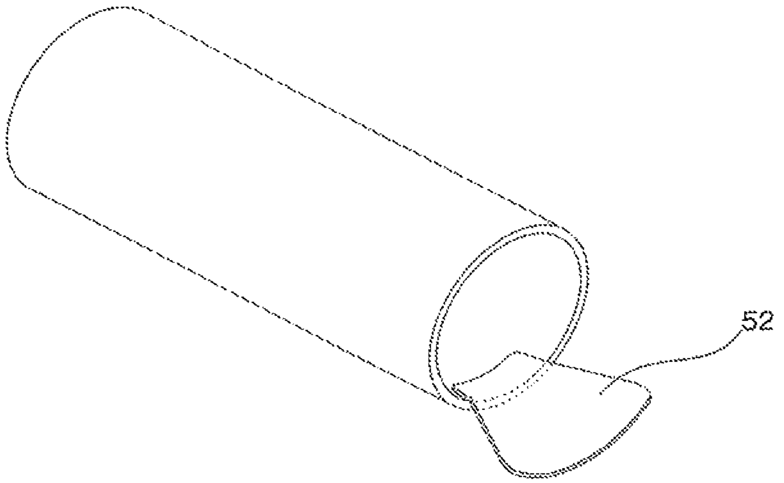
FIG. 11 is a partial perspective view showing a laboratory animal retaining appliance in accordance with further another modified embodiment of the present invention.

Further, as shown in FIG. 11, a sheet 52 composed of a resin material may be provided on the open end of either the body of the tube body or the tube body attached to the body. In general, when the operator draws back a laboratory animal by grasping and pulling the tail, the laboratory animal resists with its fore legs. Here, the operator overlaps the sheet 52 with the open end of a normal body, so that the laboratory animal is easily prevented from resisting with its fore legs. As a result, the laboratory animal is drawn back and is easily contained in the tube body and the like.

Each embodiment described above includes the circular body. However, the shape of the body includes all shapes including a quadrangle and a triangle as well as a circle. In this case, either the center of the lengthwise direction of the body or the center of the widthwise direction of the body is set to the center C, and then the hind leg hole and the tail hole or the tail groove are provided. The shape of either the tube body or the side wall is determined suitable for the shape of the body.

Each embodiment described above shows that the tail hole or the tail groove is formed in the body. However, the present invention is not limited to this. An operator who is proficient in handling the laboratory animal is able to perform an operation like an intramuscular injection to the laboratory animal by using the retaining appliance including only the hind leg hole formed in the body thereof. However, when the tail groove as well as the tail hole is formed, the operator is able to more easily use the retaining appliance of the present invention regardless of his/her proficiency. Accordingly, it is recommended that not only the hind leg hole but one of the restraint structures for tail is provided in the body.

The formation positions and shapes of the tail hole, the tail groove or the hind leg hole, etc., are determined through the appropriate combination of the embodiments as well as consideration of the foregoing descriptions While a mouse and a rat has been taken as an example in each embodiment described above, the retaining appliance of the present invention can be applied to other laboratory animals like a guinea pig by changing the size of the retaining appliance.

What is claimed is:

1. A laboratory animal retaining appliance for laboratory animal retention comprising:

a first tubular body having a first end, a second end and an outer circumferential surface, the first end of the first tubular body being open;

a hind leg hole having a diameter of sufficient size to allow at least a knee of a hind leg of the laboratory animal to pass therethrough formed into the outer circumferential surface of the first tubular body;

a tail hole formed into a wall that encloses the second end of the first tubular body, a tail groove extending along the wall from the tail hole to the outer circumferential surface of the first tubular body and extending along the outer circumferential surface of the first tubular body from the second end of the first tubular body in a direction towards the first end of the first tubular body; and a containing part for temporarily containing the laboratory animal and for introducing the laboratory animal into the first tubular body, the containing part comprising a second tubular body defining a cavity and having a first end and a second end, the second end of the second tubular body being open, the second tubular body having an outer diameter that is less than an inner diameter of the first tubular body.

2. The retaining appliance of claim 1, wherein the containing part further comprises a pusher movably coupled to the second tubular body at the first end of the second tubular body.

3. The retaining appliance of claim 2 wherein the second tubular body has an interior cavity having a volume, and wherein the pusher is axially movable along a longitudinal axis of the second tubular body to increase and decrease the volume of the interior cavity.

4. The retaining appliance of claim 2 further comprising a fixing member coupled to the pusher, the fixing member movable within a sliding groove formed into the second tubular body of the containing part.

5. The retaining appliance of claim 2 wherein the pusher is cylindrically shaped and has an outer diameter that is less than an inner diameter of the second tubular body.

6. The retaining appliance of claim 1, wherein the first tubular body and the second tubular body are formed of a rigid material.

7. The retaining appliance of claim 1 further comprising a tail notch formed into the second tubular body of the containing part, and wherein the tail notch is aligned with the tail groove when the second tubular body is coupled to the first tubular body.

8. The retaining appliance of claim 7 further comprising a sliding groove formed into the second tubular body, a pusher movably coupled to the sliding groove.

9. The retaining appliance of claim 7 wherein the second tubular body is coupled to the first tubular body so that at least a portion of the second tubular body is disposed within the first tubular body, the tail groove of the first tubular body overlying the tail notch of the second tubular body so that a passageway exists from the outer circumferential surface of the first tubular body into the cavity of the second tubular body.

10. The retaining appliance of claim 1 wherein the second tubular body has a length measured from the first end of the second tubular body to the second end of the second tubular body, and wherein the first tubular body is coupled to the second tubular body so that the first tubular body circumferentially surrounds the second tubular body along a major portion of the length of the second tubular body.

11. The retaining appliance of claim 1 wherein the inner diameter of the first tubular body is constant from the first end of the first tubular body to the second end of the first tubular body.

* * * * *